United States Patent
Schwarz et al.

(10) Patent No.: US 8,528,967 B2
(45) Date of Patent: Sep. 10, 2013

(54) REAR FLOOR STRUCTURE FOR A MOTOR VEHICLE

(75) Inventors: Martin Schwarz, Stadecken-Elsheim (DE); Juergen Hulbert, Eltville (DE); Stephan Rosenplaenter, Suizheim (DE); Joerg Fritzinger, Nauheim (DE); Andreas Stern, Ehlscheid (DE); Juergen Siebeneick, Oberwesel (DE); Michael Harder, Bodenheim (DE); Dirk Ehrlich, Bodenheim (DE); Waldemar Solnica, Wiesbaden (DE); Oleg Mazur, Nauheim (DE); Gunther Heim, Lampertheim (DE); Sven Ohligschlaeger, Alsdorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/274,613

(22) Filed: Oct. 17, 2011

(65) Prior Publication Data

US 2012/0091759 A1    Apr. 19, 2012

(30) Foreign Application Priority Data

Oct. 19, 2010   (DE) .......................... 10 2010 048 849

(51) Int. Cl.
*B62D 25/20* (2006.01)
(52) U.S. Cl.
USPC ..................................... 296/204; 296/203.04
(58) Field of Classification Search
USPC .................. 296/203.04, 203.01, 193.08, 204, 296/198, 193.07; 280/788, 781, 124.147, 280/124.155, 124.1
See application file for complete search history.

(56) References Cited

U.S. PATENT DOCUMENTS

| 5,180,206 A | 1/1993 | Toyoda |
| 6,109,653 A | 8/2000 | Maruyama et al. |
| 6,234,568 B1 | 5/2001 | Aoki |
| 2007/0200391 A1 | 8/2007 | Thoms |
| 2010/0133879 A1* | 6/2010 | Leonetti et al. .......... 296/193.08 |

FOREIGN PATENT DOCUMENTS

| DE | 8135254 U1 | 4/1982 |
| DE | 4322716 A1 | 1/1995 |
| DE | 19724624 A1 | 1/1998 |
| DE | 19954575 A1 | 5/2000 |
| DE | 69708018 T2 | 8/2002 |
| DE | 10351137 A1 | 6/2006 |
| DE | 102005058928 A1 | 6/2006 |
| DE | 102004062932 A1 | 8/2006 |
| JP | 2006044366 A | 2/2006 |
| JP | 2006062442 A | 3/2006 |
| WO | 20100121679 A1 | 10/2010 |

OTHER PUBLICATIONS

UK IPO, British Search Report dated Feb. 9, 2012 for British Application No. GB1117475.2.
German Patent Office, German Search Report for Application No. 102010048849.6, dated Jun. 14, 2011.

* cited by examiner

*Primary Examiner* — Dennis Pedder
*Assistant Examiner* — Beverly Becker
(74) *Attorney, Agent, or Firm* — Ingrassia Fisher & Lorenz, P.C.

(57) ABSTRACT

A rear floor structure for a motor vehicle includes, but is not limited to two longitudinal girders extending between rear wheel houses. A downwardly open pocket for receiving a shock absorber is formed in each of the longitudinal girders.

15 Claims, 2 Drawing Sheets

REAR FLOOR STRUCTURE FOR A MOTOR VEHICLE

CROSS-REFERENCE TO RELATED APPLICATION

This application claims priority to German Patent Application No. 102010048849.6, filed Oct. 19, 2010, which is incorporated herein by reference in its entirety.

TECHNICAL FIELD

The technical field relates to the construction of a rear floor structure for a motor vehicle, in particular a floor structure for a small car that is optimized in regard to its collision behavior.

BACKGROUND

The floor structure of a motor vehicle typically comprises a grid of longitudinal girders and crossbeams, which can be implemented as assembled or integral, for example, as a cast part. Forces which occur in the travel direction in the event of a collision must largely be absorbed and dissipated by the longitudinal girders in order to prevent a deformation of the passenger compartment which endangers the occupants. The stiffness of the longitudinal girders required for this purpose is to be achieved at the least possible weight, on the one hand, for reasons of cost-effectiveness of the manufacturing, and on the other hand, in order to allow fuel-saving operation of the vehicle.

The more compact the vehicle body of the vehicle is to be, the more difficult the requirements for the longitudinal girders are to meet. At the height of the passenger compartment, the longitudinal girders are to run on the outside along the flanks of the vehicle, so as not to restrict the foot well of the passenger compartment and to contribute to the stability of the passenger compartment against side impact. However, the longitudinal girders must run in a curve in front of and behind the passenger compartment in order to avoid the wheel houses and leave space for a spring-mounted suspension of the wheels and for shock absorbers. Roomy wheel houses which offer space for wheels and associated shock absorbers restrict the space in the vehicle body which is usable for seats of the passenger compartment or as baggage space. In addition, they make it necessary for the longitudinal girders to run offset strongly inward, which impairs their resistance against the longitudinal forces occurring in the event of a collision.

In view of the foregoing, at least one object is to provide a rear floor structure for a motor vehicle, which has a high carrying capacity at low weight and allows efficient space utilization. In addition, other objects, desirable features and characteristics will become apparent from the subsequent summary and detailed description, and the appended claims, taken in conjunction with the accompanying drawings and this background.

SUMMARY

A rear floor structure is provided that has two longitudinal girders extending between rear wheel houses, a downwardly open pocket is formed in each of the longitudinal girders to receive a shock absorber associated with one of the rear wheels. Since the rear wheel houses no longer have to provide space for the shock absorber of the wheel received therein, they may be compact, and the longitudinal girders can run at the height of the rear wheel houses with little offset to the lateral surfaces of the vehicle body. Therefore, the curvature of the longitudinal girders can be kept small, which both benefits their carrying capacity and also enlarges the usable space in the interior of the vehicle body.

If the longitudinal girders are hollow profiles having an upper wall and a lower wall, the shock absorbers can each cross one opening of the lower wall, in order to be supported on the lower wall. The otherwise nonfunctional, empty interior of the longitudinal girders can thus be used to house at least a part of the shock absorbers, which further improves the compactness of the vehicle body construction.

In order to allow sufficient spring deflection, the length of the shock absorbers cannot be excessively small. In order to be able to house these shock absorbers in a sufficient length, but not unnecessarily increase the distance of the longitudinal girders from the roadway, on the other hand, it is expedient if an area of the upper wall on which the shock absorber is supported is higher than adjacent areas of the upper wall. In particular, the area of the upper wall on which the shock absorber is supported can form the apex of a bulge of the upper wall in the form of a cupola or half-cupola. The longitudinal girders can extend linearly in the vehicle longitudinal direction between the rear wheel houses.

In order that the pocket receiving the shock absorber does not form a weak point of the longitudinal girder, it can be expedient to incorporate a support wall between the upper wall and the lower wall of each longitudinal girder, which extends in each case at least partially around the shock absorber engaging in the longitudinal girder. The longitudinal girders preferably have a hat-shaped cross-section which is open to the side, i.e., toward the rear wheel houses, at least in the area of the rear wheel houses. The hat-shaped cross-sections can each have two brim sections fastened on the wheel houses. The wheel houses thus supplement the hat-shaped cross-sections to form a highly bending-resistant closed profile, which is capable of dissipating a large quantity of impact energy.

The longitudinal girders are preferably connected to one another by floor plates, which can form a luggage compartment floor or the floor of the rear part of the passenger compartment, for example. As a result of the engagement of the shock absorbers in the pockets of the longitudinal girders, they may be situated at a relatively small distance above the roadway, so that the floor plates no longer have to extend in a trough down to below the longitudinal girders, but rather can run essentially linearly at the height of the longitudinal girders. The strength resulting therefrom against tensile forces acting the vehicle transverse direction contributes to the stability of the floor structure.

Furthermore, a crossbar can contribute to the stability of the longitudinal girders at the height of the pockets receiving the shock absorbers, which connects the longitudinal girders to one another at the height of these pockets and thus makes it more difficult for the longitudinal girders to buckle toward one another under load.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
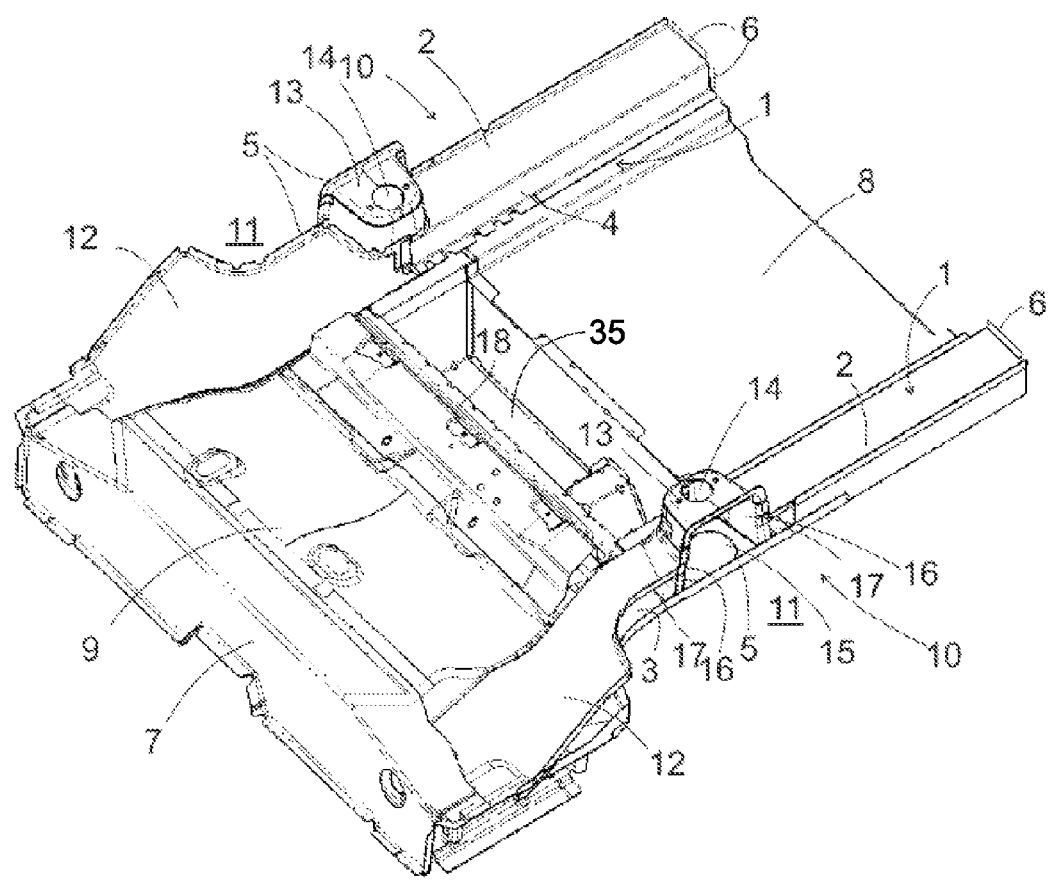
FIG. 1 shows a perspective view of a rear floor structure according to an embodiment.

FIG. 1 shows a perspective transparent view of a rear floor structure for a motor vehicle. The lateral flanks of this floor structure are formed by two longitudinal girders 1. The two longitudinal girders 1 are each profiles open toward the vehicle outer side having a hat-shaped cross-section, which, as may be seen better in FIG. 3, each have an essentially horizontal upper wall 2, a lower wall 3, a side wall 4, which connects the walls 2, 3 and forms the brim of the hat-shaped cross-section, and webs 5, which are essentially vertical like the side wall 4. The longitudinal girders 1 shown in FIG. 1 each carry flanges 6 on their rear end for fastening a shock absorber support (not shown). A crossbeam 7, which connects the front ends of the longitudinal girders 1, to one another is under the front edge of the seat cushions of a rear row of seats in the completely assembled vehicle and forms a rear wall of the foot well for the passengers in the backseat. A rear floor plate 8, a trough 35, and a front floor plate 9 fill up the area bounded by the longitudinal girders 1 and crossbeams 7.

Figure 2:
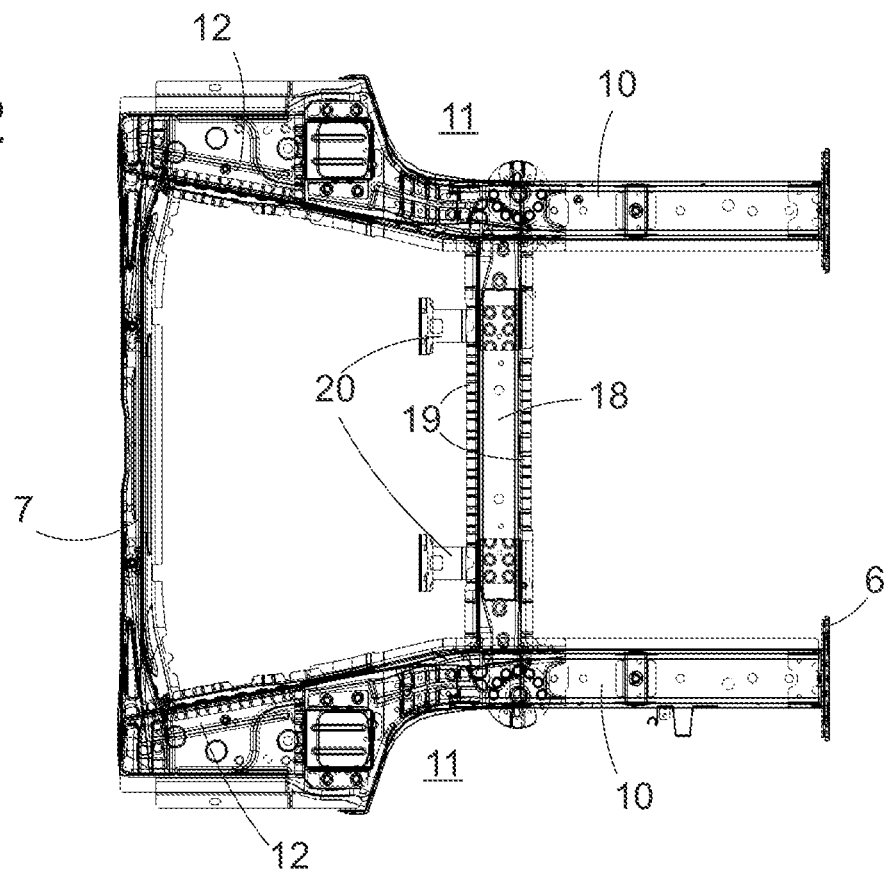
FIG. 2 shows a top view of the girders of the rear floor structure.

As may be seen most clearly in FIG. 2, the linear rear sections 10 of the longitudinal girders 1, which are parallel to one another, extend along recesses 11, which are provided to receive wheel houses (not shown in FIG. 1 and FIG. 2). Front sections 12 of the longitudinal girders 1 run divergently from a front edge of the recesses 11 to the crossbeam 7. While the lower edge of the longitudinal girders 1 runs essentially horizontally along the recess 11, the upper wall 2 locally forms an upwardly curved cupola 13. The cupola 13 is not complete, a part of its side wall is missing on its side facing toward the adjacent recess 11. An opening 14 at the apex of the cupola 13 is provided to receive the head end of a shock absorber (not shown in FIG. 1 and FIG. 2) therein, which engages on a rear wheel of the vehicle, which is housed in the adjacent recess 11. The body of the shock absorber extends freely through an opening 15 cut in the lower wall 3. Two sections of a support wall 16, which connect the walls 2, 3 to one another by extending the side walls of the cupola 13, can be recognized in front of and behind the opening 15 in FIG. 1. An angled lower fastening flange 17 of the support wall 16 is welded to the lower wall 3. An upper edge of the support wall 16 contacts a pedestal zone of the side wall of the cupola 13 from the inside and is welded thereto. The support wall 16 can extend integrally in the curve around the opening 15 and the shock absorber, or it can be divided into two sections, which each cross the free cross-section of the longitudinal girder 1 and have an edge fastened on its side wall 4.

FIG. 2 shows a top view of the substructure of FIG. 1, in which the floor plates 8, 9 are left out. It may be seen here that the longitudinal girders 1 are additionally connected at the height of their two cupolas 13 by a crossbeam 18 running below the floor plates 8, 9. The crossbeam 18 has a hat-shaped cross-section like the longitudinal girder 1, whose opening is oriented upward, however, so that the webs 19 of the crossbeam 18 are on top and are welded to the essentially level rear floor plate 8. Arms 20 extending forward from the crossbeam 18 support the three-dimensionally structured floor plate 9, which extends under the rear row of seats in the completely assembled vehicle.

Figure 3:
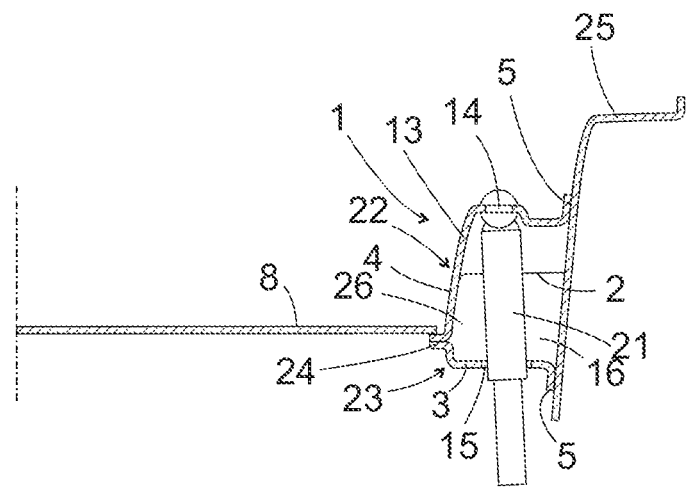
FIG. 3 shows a schematic cross-section through a part of the rear floor structure.

FIG. 3 shows a schematic partial cross-section of the floor structure, whose section plane runs through the cupola 13 of one of the longitudinal girders 1 and shows the shock absorber anchored therein, identified here by 21. Furthermore, it may be seen here that the longitudinal girder 1 is assembled from two elongate elements 22, 23, of which the upper element 22 forms the upper wall 2, including the cupola 13, and a part of the side wall 4, and the lower element 23 forms the lower wall 3 and the remainder of the side wall 4. Both are connected to one another on webs 24 protruding toward the vehicle interior, which are in turn used as a support surface on which the floor plate 8 is welded.

A wheel house 25 is welded to the webs 5 of the elements 22, 23 and the support wall 16. The wheel house 25 closes the open side of the longitudinal girder 1, so that a dimensionally-stable hollow profile having closed cross-section is obtained. The cupola 13, the support wall 16 extending downward, and the opening 15 together form a pocket 26 open to the bottom, which receives a large part of the shock absorber 21.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A rear floor structure for a motor vehicle, comprising:
   rear wheel houses; and
   two longitudinal girders extending between the rear wheel houses,
      wherein each of the two longitudinal girders extend substantially linearly in a longitudinal direction of the motor vehicle and have hollow profiles defined by an upper wall and a lower wall, and
      wherein each of the two longitudinal girders comprise:
         a downwardly open pocket formed therein that is configured to receive a shock absorber, wherein the shock absorber that is received in each downwardly open pocket crosses an opening of the lower wall in order to be supported on the upper wall; and
         a support wall that extends at least partially around the shock absorber, and that is incorporated between the upper wall and the lower wall of that longitudinal girder.

2. The rear floor structure according to claim 1, wherein an area of each upper wall on which the shock absorber is supported is higher than adjacent areas of that upper wall.

3. The rear floor structure according to claim 1, wherein an area of each upper wall on which the shock absorber is supported forms an apex of a bulge of the upper wall like at least a half cupola.

4. The rear floor structure according to claim 1, wherein each of the two longitudinal girders extend substantially linearly in the longitudinal direction of the motor vehicle along recesses for the rear wheel houses.

5. The rear floor structure according to claim 1, wherein each of the two longitudinal girders have a hat-shaped cross-section, wherein each hat-shaped cross-section opens toward one side at least in an area of one of the rear wheel houses.

6. The rear floor structure according to claim 5, wherein each hat-shaped cross-section has two brim sections fastened to one of the rear wheel houses.

7. The rear floor structure according to claim 1, wherein the two longitudinal girders are connected by a floor plate.

8. The rear floor structure according to claim 7, wherein the floor plate extends at a height of the two longitudinal girders.

9. The rear floor structure according to claim 1, wherein the two longitudinal girders are connected by a crossbar at a height of the downwardly open pocket.

10. A rear floor structure for a motor vehicle, comprising:
rear wheel houses; and
two longitudinal girders extending between the rear wheel houses,
wherein the two longitudinal girders each have:
   hollow profiles having an upper wall and a lower wall; and
   a downwardly open pocket formed therein that is configured to receive a shock absorber that crosses an opening of the lower wall in order to be supported on the upper wall.

11. The rear floor structure according to claim 10, wherein an area of the upper wall on which each shock absorber is supported is higher than adjacent areas of the upper wall.

12. The rear floor structure according to claim 10, wherein an area of the upper wall on which the shock absorber is supported forms an apex of a bulge of the upper wall like at least a half cupola.

13. The rear floor structure according to claim 10, wherein the two longitudinal girders extend substantially linearly in a vehicle longitudinal direction between the rear wheel houses.

14. The rear floor structure according to claim 10, further comprising:
a support wall that extends at least partially around the shock absorber and that engages the two longitudinal girders, wherein the support wall is incorporated between the upper wall and the lower wall of the two longitudinal girders.

15. A rear floor structure for a motor vehicle, comprising:
rear wheel houses; and
two longitudinal girders extending between the rear wheel houses,
wherein each of the two longitudinal girders comprise:
   a hat-shaped cross-section open toward one side at least in an area of one of the rear wheel houses, wherein each hat-shaped cross-section has two brim sections fastened to one of the rear wheel houses; and
   a downwardly open pocket formed therein that is configured to receive a shock absorber.

* * * * *